United States Patent [19]

McManus

[11] Patent Number: 5,401,398
[45] Date of Patent: * Mar. 28, 1995

[54] MEDIA FOR ROTATING BIOLOGICAL CONTACTOR

[75] Inventor: Michael J. McManus, Erie, Pa.
[73] Assignee: Geo-Form, Inc., Erie, Pa.
[ * ] Notice: The portion of the term of this patent subsequent to Sep. 27, 2094 has been disclaimed.
[21] Appl. No.: 288,992
[22] Filed: Aug. 11, 1994

Related U.S. Application Data

[63] Continuation-in-part of Ser. No. 68,773, Jun. 1, 1993, Pat. No. 5,350,507.

[51] Int. Cl.$^6$ ............................ C02F 3/08; C02F 3/10
[52] U.S. Cl. ................................ 210/150; 210/151; 261/DIG. 72
[58] Field of Search .................... 210/150, 151; 261/122.1, DIG. 72; D23/1

[56] References Cited

U.S. PATENT DOCUMENTS

| | | | |
|---|---|---|---|
| D. 232,174 | 7/1974 | La Borde | 261/DIG. 72 |
| D. 232,236 | 7/1974 | La Borde | D23/1 |
| D. 232,237 | 7/1974 | La Borde | D23/1 |
| D. 232,238 | 7/1974 | La Borde | D23/1 |
| 2,212,938 | 8/1940 | Fairlie | 261/94 |
| 3,364,656 | 1/1968 | Whiton et al. | 55/91 |
| 3,389,798 | 6/1968 | Hartmann et al. | 210/150 |
| 3,540,589 | 11/1970 | Boris | 210/150 |
| 3,758,087 | 9/1973 | Hoon, Jr. | 261/94 |
| 3,882,027 | 5/1975 | Lunt | 210/500 |
| 3,894,899 | 7/1975 | Konopatou et al. | 210/404 |
| 3,913,890 | 10/1975 | Lankenau et al. | 259/3 |
| 3,957,931 | 5/1976 | Ellis et al. | 261/98 |
| 3,985,653 | 10/1976 | Ahlgren | 210/150 |
| 4,028,244 | 6/1977 | Holmberg | 210/150 |
| 4,086,307 | 4/1978 | Glaspie | 261/DIG. 72 |
| 4,115,269 | 9/1978 | Bennett et al. | 210/150 |
| 4,137,172 | 1/1979 | Sako et al. | 210/150 |
| 4,160,736 | 7/1979 | Prosser | 210/150 |
| 4,200,532 | 4/1980 | Iwatani et al. | 210/151 |
| 4,275,019 | 6/1981 | Bednarski | 261/DIG. 72 |
| 4,333,893 | 6/1982 | Clyde | 210/150 |
| 4,419,165 | 12/1983 | LaValley | 210/404 |
| 4,425,285 | 1/1984 | Shimoi et al. | 261/95 |
| 4,468,326 | 8/1984 | Kawert | 210/150 |
| 4,482,920 | 11/1984 | Banai et al. | 428/184 |
| 4,537,731 | 8/1985 | Billet et al. | 261/DIG. 72 |
| 4,540,491 | 9/1985 | Zimmer | 210/150 |
| 4,554,114 | 11/1985 | Glen et al. | 261/95 |
| 4,668,387 | 5/1987 | Davie et al. | 210/150 |
| 4,668,442 | 5/1987 | Lang | 261/94 |
| 4,729,828 | 3/1988 | Miller | 210/150 |
| 4,737,278 | 4/1988 | Miller | 210/150 |
| 4,921,661 | 5/1990 | Lavin | 261/112.2 |
| 5,112,760 | 5/1992 | Baumgartner et al. | 210/150 |

FOREIGN PATENT DOCUMENTS

| | | | |
|---|---|---|---|
| 0008810 | 3/1980 | European Pat. Off. | 210/150 |
| 1405374 | 11/1965 | France . | |
| 0012146 | 1/1979 | Japan | 210/150 |
| 55-167021 | 12/1980 | Japan | 261/DIG. 72 |
| 193633 | 1/1938 | Switzerland | 210/150 |
| 1275116 | 5/1972 | United Kingdom . | |
| 1423503 | 9/1988 | U.S.S.R. | 210/150 |

*Primary Examiner*—Cynthia Nessler
*Attorney, Agent, or Firm*—Charles L. Lovercheck; Wayne L. Lovercheck

[57] ABSTRACT

A random media member for a rotating biological contactor. The media member has a concave hemispherical shaped body with an inner tube with radial plate like ribs and an outer tube with radial plate like ribs, all molded together as an integral part. In one embodiment, a hollow cylinder is molded to the outside of the body. In another embodiment, parallel spaced legs are substituted for the outer cylinder. The tubes and ribs provide surfaces for bacteria to attach.

15 Claims, 2 Drawing Sheets

MEDIA FOR ROTATING BIOLOGICAL CONTACTOR

This is a continuation-in-part of application Ser. No. 08/068,773, filed Jun. 1, 1993, now U.S. Pat. No. 5,350,507.

BACKGROUND OF THE INVENTION

All known Rotating Biological Contactors (RBCs) have a common rotating shaft surrounded by media. These secondary biological treatment devices are exposed to the primary clarifier effluent and constantly rotate during the treatment process. This rotational force causes the solids to accumulate in the shaft area.

Applicant is aware of the following U.S. patents which revolve around rotating biological contactors: U.S. Pat. No. 232,236 to LaBorde for a module for a filter media or similar article; U.S. Pat. No. 232,237 to LaBorde for a module for a filter media or similar article; U.S. Pat. No. 232,238 to LaBorde for a module for a filter media or similar article; U.S. Pat. No. 2,212,932 to Fairlie for a filling material for reaction spaces; U.S. Pat. No. 3,364,656 to Whiton, et al for a method for effecting countercurrent contacting of gas and liquid streams; U.S. Pat. No. 3,540,589 to Boris for an apparatus for the purification of polluted water; U.S. Pat. No. 3,758,087 to Hoon, Jr. for a contact device; U.S. Pat. No. 3,882,027 to Lunt for a random packing medium; U.S. Pat. No. 3,913,890 to Lankenau, et al for relatively hard unattached objects to inhibit caking and scaling in a horizontal pipeline; U.S. Pat. No. 3,957,931 to Ellis, et al for a fluid-fluid contact method and apparatus; U.S. Pat. No. 4,115,269 to Bennett, et al for random packing materials; U.S. Pat. No. 4,137,172 to Sako, et al for rotating biological contactor; U.S. Pat. No. 4,160,736 to Prosser for a rotating trickling filter; U.S. Pat. No. 4,200,532 to Iwatani, et al for a waste water treatment apparatus; U.S. Pat. No. 4,333,893 to Clyde for a high area contactor; U.S. Pat. No. 4,425,285 to Shimoi, et al for a packing material unit; U.S. Pat. No. 4,554,114 to Glen, et al for a packing element and method using same; U.S. Pat. No. 4,668,442 to Lang for column packing; U.S. Pat. No. 4,842,920 to Banai, et al for plastics elements for inordinate film-flow packings; U.S. Pat. No. 4,921,641 to Lavin for liquid-vapor contact columns; and, U.S. Pat. No. 5,112,760 to Baumgartner, et al for a mass transfer membrane for oxygenation of animal cell reactors. Applicant is also aware of the following foreign patents: British Patent No. 1,275,116 and French Patent No. 1,405,374.

Rotating Biological Contactor (RBC) technology involves a fixed film, attached growth biological reactor for reducing the organic components of domestic and industrial waste waters.

RBCs consist of a center shaft, usually constructed of steel, with plastic sheets (Media) attached to that shaft. These sheets of media are typically twelve feet in diameter. The media is typically forty percent (40%) immersed in waste water. As the shaft rotates, films of the waste water adhere to the plastic media. Bacteria, present in the waste water, adhere to the plastic sheets as a film of slime. This film is called the bio-mass. While it is impossible to count each bacteria or the clusters of bacteria, the population of bacteria is determined by the square footage of surface area that the plastic media provides as residence.

Bacteria, like people, require two basic fundamental elements to sustain their life and propagate: 1. Oxygen and 2. Food. As the RBC rotates, the bacteria are subjected to the atmosphere, which is their source of oxygen. As the rotation continues, the bacteria become immersed in the waste water. The organic constituents of the waste water become the food source for the bacteria. Thus, as the bacteria sustain their own life, they reduce the contamination in the waste water by utilizing the organic matter as food.

This method of waste water treatment was developed in the early 1970's. There was some activity in Europe in 1968, but these were really preliminary efforts that led to the current technology. The earliest studies done in the United States on prototype units were done in about 1973. The RBC process employs four basic components in its approach. There is a concrete holding tank, a central shaft to which is attached the "media" the "Media" itself and a power transmission system that keeps the media in constant rotational motion.

The tank provides the environment in which the process occurs. It constricts the path of the waste water stream to allow maximum exposure of the waste stream to the "media". The steel shaft can consist of a hollow tube or solid shaft and can be round, square, or octagonal in shape.

The "media" is the heart of the process. The "media" provides the surface area for bacteria to attach themselves. The greater the surface area available, the larger the bacteria population for the digestive process. In conventional RBCs, the media consists of alternate layers of formed and flat sheets of polyethylene, thermally welded to produce controlled, uniform spacing. The media is attached to the shaft through a hub assembly and the final shape of the RBC is a cylindrical drum.

In the actual operation of the RBC unit, the polyethylene sheet is submerged forty percent into the waste water stream. By a constant rotational action (approximately 1.6 revolutions per minute) the media surfaces are kept in contact with the waste stream. This rotational action is designed to alternately expose the bacteria to the waste stream as a food source and to then expose the bacteria to the air for oxygenation. It is through this alternate exposure that the digestive process is optimized.

The major advantage of this process is that it is simple and energy efficient to run. The installation is cost competitive with other systems; however, the major cost advantage is in its low energy requirements during operation. The biological effectiveness of the process makes it attractive; however, the current technology does not optimize bacteria growth, nor utilization of the bio-mass. Disadvantages of RBCs are numerous. From a process performance perspective, RBCs have a limited oxygenation capacity. The media is only forty percent immersed in the waste water. Therefore, a "dead zone" exists near the center shaft. Solids accumulate and build-up near the center shaft because radial velocities are minimal, and the area is subject to minimal water scouring. Because of these reasons, many RBCs never perform to the standards of the original design. Operational data demonstrates the system is unreliable, inconsistent, and undependable.

The media has experienced problems of collapsing due to the weight of the solids build-up and retention. Additionally, many problems have been realized in the failure of the bonding of the plastic media sheets to the center steel shaft.

Shaft problems have been experienced where the shaft would shear under the load of excessive solids retained by the media. Because of this anticipated excessive loading, bearing problems have also been realized.

SUMMARY OF THE INVENTION

The first significant difference between the applicant's invention and a conventional RBC is that applicant utilizes a random loose media rather than fixed sheets of plastic. The media can be made from either polyethylene or polypropylene. The random nature of the media allows the media to tumble during the rotation of the system, facilitating self-cleaning and increased oxygenation of the effluent. A second significant improvement centers around the use of a composite material (fiberglass) drum to hold the random media. The drum is approximately seventy percent open space to enhance hydraulic movement of the waste water. This structure is non-corrosive due to its construction materials. It is also designed without a center shaft; thus, it is not subject to shaft breakage. The incorporation of a tumbling media eliminates the dead zone at the center of rotation. The media moves randomly from the center to the outside and then back toward the center.

The media has several characteristics that offers improved performance over sheet media. First of all, it is hemispherical in shape. This geometry allows the media to trap air as it enters into the liquor during its rotational path. Somewhere toward the bottom of its rotational path, it will release the trapped air which promotes oxygenation of the effluent. While the media continues on its rotational path in an upward direction, its cup shape bails the water and begins to lift the liquor above the mean level of the waste water. Again, at some point toward the apex of the rotational path, the hemispherical media will upset and dump its cargo of waste water causing it to trickle over the other media on its path back to the liquor mean level. This is a second oxygenation action; and contact area of the waste water with the bio-mass.

The media has other significant features which aid the process. The inside of the hemisphere contains radial ribs perpendicular to the curvature of the hemisphere. These ribs not only give strength to the geometry of the hemisphere, they also give surface area on which bacteria can grow. By increasing or decreasing the number of ribs, the surface area of the hemisphere can be controlled. One additional function of the ribs is to prevent the media pieces from "nesting" during operation. "Nesting" would reduce the effective surface area of the process. Also, incorporated in the design of the hemisphere is a textured surface on the outside of the hemisphere. This texture gives the bacteria an undisturbed surface on which to adhere. Since the random media has a natural tendency to scour itself because of the rubbing action of one media piece against another, the raised surface of the texture contact one another while the depressed area remain protected. A final significant design feature of the media in the incorporation of several legs protruding from the surface farthest from the major diameter of the hemisphere. These appendages, which are about ⅛th of an inch long, prevent the media from sliding when it reaches the apex of its circular path. By causing the media to tumble instead of slide, they facilitate the dumping of the liquor thus promoting the trickling effect.

A small cylindrical member is provided on the outside hemispherical surface of the media member to keep the media separated. Random media is rotating biological devices and inclined to rest against one another and thereby, shield the area from getting bacteria. I have provided legs on the outside hemispherical surfaces to keep the media member engaging each other.

It is an object of the present invention to provide an improved media member in combination with a rotatable drum.

It is another object of the present invention to provide an improved media member for rotating biological contactor that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

DESCRIPTION OF THE PREFERRED EMBODIMENT(S)

Figure 1:
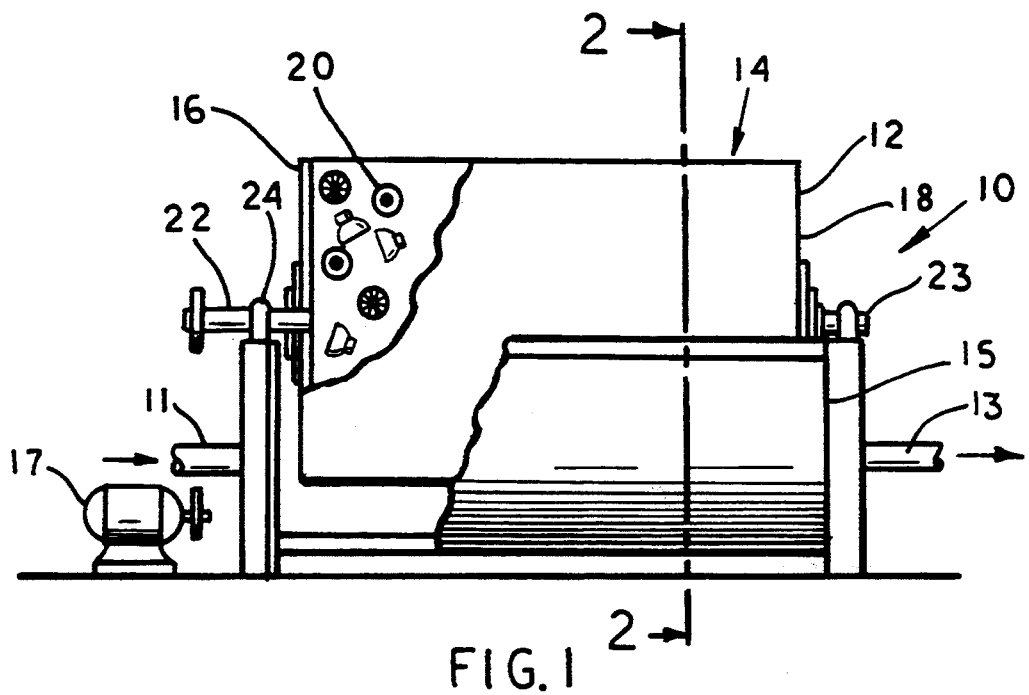
FIG. 1 is a side view partly in section of the rotational biological contactor according to the invention.

Now with more particular reference to the drawings, reactor 10 is used in the aerobic biobacterialogical treatment of polluted waste water and is made up of drum 12 rotating by motor 17.

Drum 12 has hollow cylindrical body 14 made of fiberglass having end shields 16,18 which close the ends of hollow cylindrical body 14.

Hollow cylindrical body 14 is rotatable on stub shafts 22,23 that are fixed to end shields 16,18. Stub shafts 22,23 are rotatably received in bearings 24 supported on tank 15, with no obstruction in tank 15.

Tank 15 could have inlet 11 and outlet 13 at opposite sides to provide flow through tank 15 perpendicular to stub shafts 22,23. Stub shafts 22,23 terminate at the outside of end shields 16,18 and do not extend through rotatable drum 12 to obstruct the movement of media members 20 therein.

Media members 120, shown in FIGS. 2, 3, 5 and 7 have body 132. Body 132 has a concave hemispherical inner surface 134 and concave hemispherical outer surface 136 that terminate in equatorial rim 133. Legs 140 have larger ends integrally attached to outer surface 136 and extend generally parallel to central axis 150 of body 132. Legs 140 may be of a length of about one-half of the diameter of body 132.

Gusset plates 146 are integrally attached to legs 140 and extend upwardly and outwardly from legs 140 and are integrally attached to body 132. Gusset plates 146 reinforce legs 140 and add additional areas to which bacteria may adhere. Legs 140 and gusset plates 146 make up projection means. Inner central tubular member 141 is disposed concentric to central axis 150 and inner plate like ribs 144 are attached to inner surface 134 and extend to rim 133.

Figure 2:
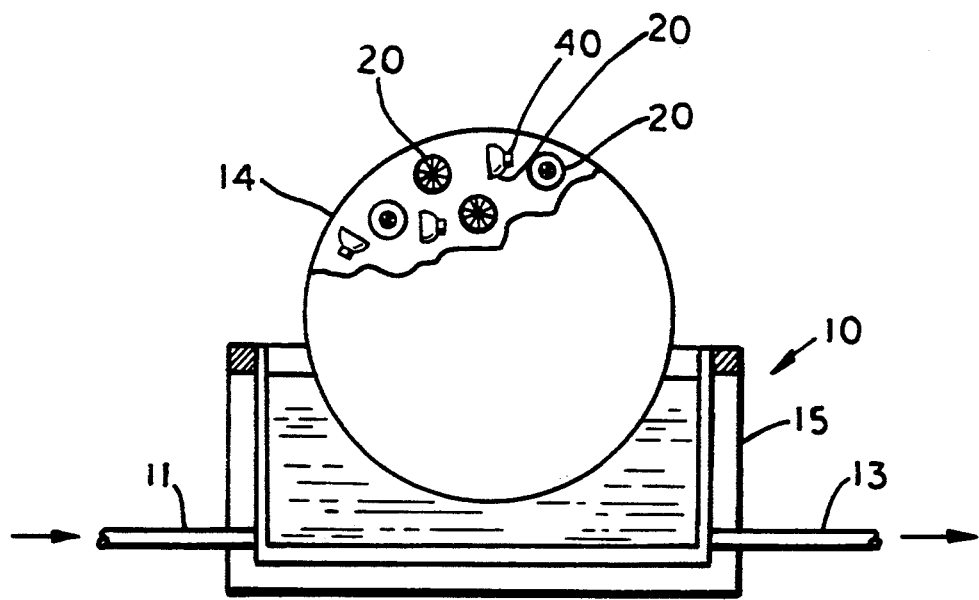
FIG. 2 is a longitudinal cross sectional view of the biological contactor shown in FIG. 1.
Figure 3:
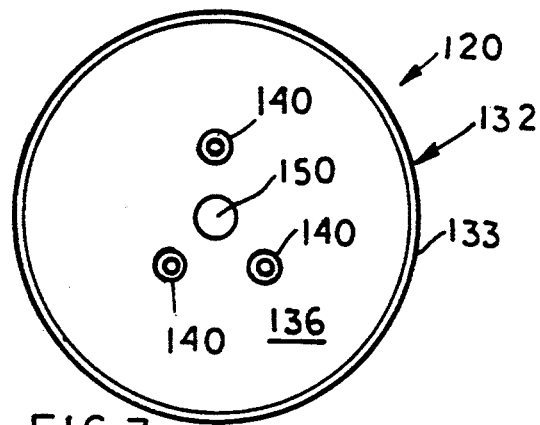
FIG. 3 is a top view of a random media member.
Figure 4:
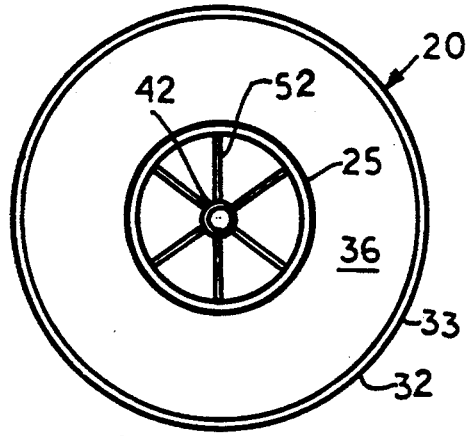
FIG. 4 is a top view of another embodiment of a random media member.
Figure 5:
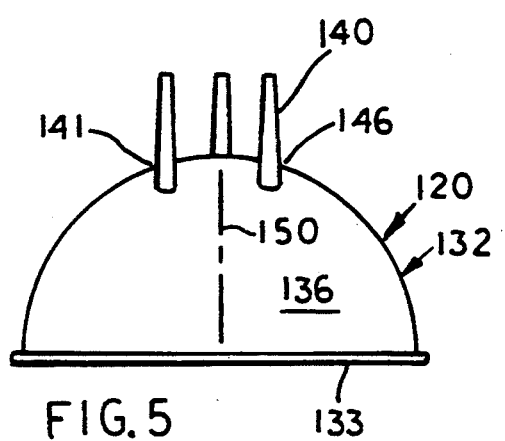
FIG. 5 is a side view of the media member shown in FIG. 3.
Figure 6:
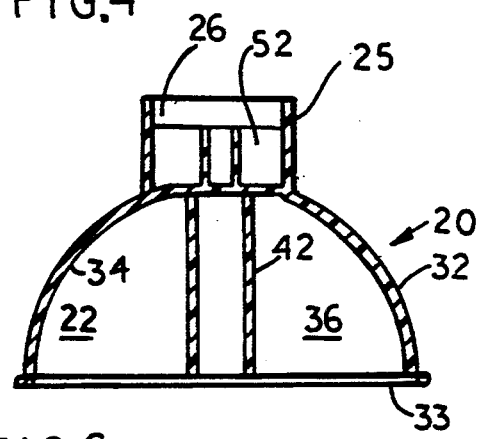
FIG. 6 is a side view partly in cross section of the media member shown in FIG. 4.
Figure 7:
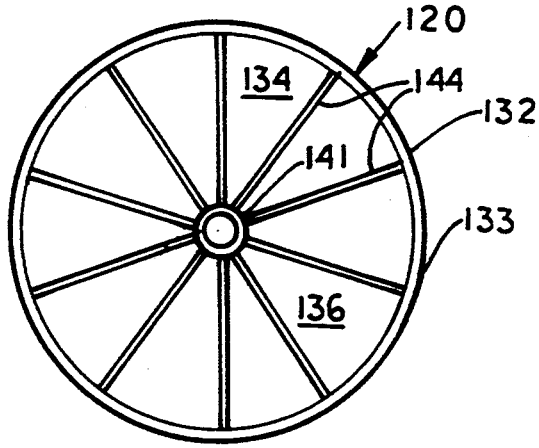
FIG. 7 is a bottom view of the embodiment of the media member shown in FIGS. 4 and 6.

In the embodiment of the example of the invention shown in FIGS. 2, 4 and 6, cup-shaped random media members 20 having hollow body 32 having rim 33, concave hemispherical inner surface 34 and convex hemispherical outer surface 36 Equatorial rim 33 is integrally attached to body 32. Central inner tubular member 42 is integrally attached to inner hemispherical surface 34. Plate-like inner rib members 22 are integrally fixed to hemispherical inner surface 34 and to central inner tubular member 42 and are radially spaced from each other. Plate-like inner rib members 22 have edges that extend to a plane contained by equatorial rim 33.

Cylindrical outer member 25 is integrally attached to hemispherical outer surface 36 of body 32 and provides an outer projection means. Plate-like outer rib members 52 are fixed to inner tubular member 42 and to cylindrical outer member 25. Cylindrical outer member 25 has an inside cylindrical surface 26 and radially extending plate like ribs 52 are integrally attached to outer tube and to inside surface 26 to increase the effective area of body 32 from rubbing bacterial off on one another and to provide a mass area for bacteria.

Figure 8:
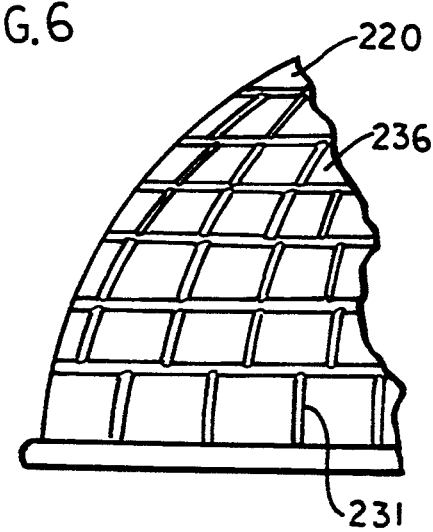
FIG. 8 is a partial side view of the random media member similar to the embodiment of FIGS. 4, 5 and 7, but with a grooved external surface.

In the embodiment of FIG. 8, random media member 220 has outer convex surface 236 like the embodiment of FIGS. 1 through 7 with grooves 231 to increase the surface area for bacteria to deposit on. Instead of grooved grid pattern 231, a rib pattern could be used.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In a rotating biological contactor system for treating waste water, said system comprising tank means, drum means rotatably supported in said tank means, and inlet means and outlet means each connected to said tank means for directing said waste water through said tank means, the improvement comprising:
   random media members in said drum means providing an exposed area, said exposed area defining means for supporting bacteria from said waste water;
   each of said random media members having an impervious, generally cup-like body;
   said body having a central axis, an outer generally convex surface, and an inner generally concave surface; and,
   projection means fixed to said outer generally convex surface, said projection means extending therefrom generally parallel to said central axis of said body for engaging other media members to provide separation for said random media member from said other media members.

2. The system recited in claim 1 wherein rib members are disposed on said inner concave surface and terminate in a plane concentric to a rim on said body; and,
   a tubular inner member is fixed to said inner concave surface and extends generally parallel to said central axis and terminates at a plane parallel to said rim.

3. The system recited in claim 2 wherein said projection means comprises a cylindrical member fixed to said outer convex surface; and,
   said cylindrical member having a central axis generally perpendicular to said outer convex surface.

4. In a rotating biological contactor system for treating waste water, said system comprising tank means, drum means rotatably supported in said tank means, and inlet means and outlet means each connected to said tank means for directing said waste water through said tank means, the improvement comprising:
   random media means in said drum means for providing exposed media area and for supporting bacteria from said waste water;
   said random media means comprising impervious hemispherical shaped media members each having a generally hemispherical inside surface, an outside surface, an axis member and radially extending plate-like ribs fixed to said axis member and to said generally hemispherical inside surface; and,
   projection means fixed to said outside surface, said projection means extending therefrom generally parallel to a central axis of each of said impervious hemispherical shaped media members for engaging other media members to provide separation for each of said impervious hemispherical shaped media members from said other media members.

5. A random media member for use in a rotating biological contactor comprising an impervious body having a concave inner surface, a convex outer surface, a rim and a central axis perpendicular to said rim; and,
   an outer projection means attached to said convex outer surface generally parallel to said central axis for engaging other media members to provide separation for said random media member from said other media members;
   wherein said random media member defines means for supporting bacteria.

6. The random media member recited in claim 5 wherein a central inner tubular member is integrally affixed to said concave inner surface and extends generally parallel to said central axis.

7. The random media member recited in claim 6 wherein radially extending plate-like inner rib members are integrally attached to said concave inner surface and integrally attached to said inner tubular member.

8. The random media member recited in claim 7 wherein each of said inner rib members are disposed on said concave inner surface and extend in a plane perpendicular to a plane containing said rim.

9. The random media member recited in claim 7 wherein said projection means comprises a hollow generally cylindrical outer member having an inside generally cylindrical member disposed substantially concentric to said central axis and is integrally attached to said convex outer surface.

10. The random media member recited in claim 9 wherein said convex outer surface is generally hemispherical.

11. The random media member recited in claim 1 wherein said projection means comprises legs fixed to said convex outer surface.

12. The random media member recited in claim 11 wherein said legs are integrally attached to said convex outer surface; and, said legs are larger adjacent said body and taper from said body.

13. The random media member recited in claim 12 wherein gusset plates are attached to said legs and to said convex outer surface.

14. The random media member recited in claim 13 wherein said convex outer surface is generally hemispherical in shape.

15. The random media member recited in claim 13 wherein said concave inner surface is generally hemispherical in shape.

* * * * *

UNITED STATES PATENT AND TRADEMARK OFFICE
CERTIFICATE OF CORRECTION

PATENT NO. : 5,401,398

DATED : March 28, 1995

INVENTOR(S) : Michael J. McManus

It is certified that error appears in the above-identified patent and that said Letters Patent is hereby corrected as shown below:

Column 7, line 1, delete "1" and insert --5--.

Signed and Sealed this

Sixth Day of June, 1995

Attest:

BRUCE LEHMAN

Attesting Officer

Commissioner of Patents and Trademarks